(12) United States Patent
Murphy

(10) Patent No.: US 9,284,476 B2
(45) Date of Patent: Mar. 15, 2016

(54) TREATMENT FLUIDS COMPRISING MAGNETIC SURFACTANTS AND METHODS RELATING THERETO

(75) Inventor: Robert J. Murphy, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 712 days.

(21) Appl. No.: 13/620,765

(22) Filed: Sep. 15, 2012

(65) Prior Publication Data

US 2014/0076552 A1    Mar. 20, 2014

(51) Int. Cl.
*E21B 43/16* (2006.01)
*C09K 8/035* (2006.01)

(52) U.S. Cl.
CPC ..................... *C09K 8/035* (2013.01)

(58) Field of Classification Search
None
See application file for complete search history.

(56) References Cited

U.S. PATENT DOCUMENTS

| | | | |
|---|---|---|---|
| 4,691,774 A | 9/1987 | Nelson | |
| 4,802,534 A | 2/1989 | Larson et al. | |
| 4,834,898 A * | 5/1989 | Hwang | 252/62.56 |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 5,258,137 A | 11/1993 | Bonekamp et al. | |
| 5,452,745 A | 9/1995 | Kordonsky et al. | |
| 5,905,061 A | 5/1999 | Patel | |
| 5,977,031 A | 11/1999 | Patel | |
| 6,828,279 B2 | 12/2004 | Patel et al. | |
| 7,021,406 B2 | 4/2006 | Zitha | |
| 7,032,670 B2 | 4/2006 | Zitha | |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 8,122,975 B2 | 2/2012 | Belcher et al. | |
| 2003/0019627 A1 | 1/2003 | Qu et al. | |
| 2005/0109540 A1 | 5/2005 | Zitha | |
| 2008/0296530 A1 * | 12/2008 | Fuchs et al. | 252/62.54 |
| 2010/0314118 A1 | 12/2010 | Quintero et al. | |
| 2010/0323931 A1 | 12/2010 | Crawshaw et al. | |
| 2011/0186297 A1 | 8/2011 | Zhang et al. | |
| 2011/0297394 A1 | 12/2011 | VanDelden | |
| 2012/0067577 A1 | 3/2012 | Roddy | |
| 2014/0041862 A1 * | 2/2014 | Ersoz | G01V 3/30 166/250.1 |

FOREIGN PATENT DOCUMENTS

WO    2014043191 A1    3/2014

OTHER PUBLICATIONS

International Search Report and Written Opinion for PCT/US2013/059197 dated Dec. 23, 2013.
Brown et al., "Magnetic Control over Liquid Surface Properties with Responsive Surfactants," Angew. Chem. Int. Ed. 2012, 51, 2414-2416.
Halliburton Product Data Sheet entitled "Baracarb® Bridging Agent," 2010.
Halliburton Product Data Sheet entitled "Steelseal® Lost Circulation Material," 2010.
Halliburton Product Data Sheet entitled Wall-Nut® Lost Circulation Material, 2010.
Halliburton Product Data Sheet entitled "Baraplug® Bridging Agent," 2010.
Halliburton Product Data Sheet entitled Barofibre® Lost Circulation Material, 2010.
White, Robert J., "Lost Circulation Materials and Their Evaluation," 1956.

* cited by examiner

*Primary Examiner* — Angela M DiTrani
(74) *Attorney, Agent, or Firm* — McDermott Will & Emery LLP; Holly Soehnge

(57) ABSTRACT

Treatment fluids that include magnetic surfactants may be useful in various subterranean operations, e.g., particulate placement operations and drilling operations. For example, some methods may include introducing a treatment fluid into a wellbore penetrating a subterranean formation, the treatment fluid including at least a base fluid and a magnetic surfactant, the magnetic surfactant being a cationic surfactant having a magnetically susceptible counterion.

18 Claims, No Drawings

TREATMENT FLUIDS COMPRISING MAGNETIC SURFACTANTS AND METHODS RELATING THERETO

BACKGROUND

The present invention relates to treatment fluids comprising magnetic surfactants and methods relating thereto.

Viscosified treatment fluids are useful in a variety of subterranean operations including those that transport particles like drill cuttings, proppants, and gravel. Increasing the viscosity of a fluid is typically achieved through the use of viscosifying agents like clays, polymers, and crosslinked polymers. As used herein, "treatment fluid" refers to any fluid that may be used in a subterranean application in conjunction with a desired function and/or for a desired purpose (i.e., any "treatment"). The terms "treatment" and "treatment fluid" do not imply any particular action and encompass, inter alia, drilling fluids, lost circulation fluids, fracturing fluids, acidizing fluids, and the like.

In some cases during drilling, completing, or remediating a subterranean well, it is desirable to have a fluid with viscosity and apparent density that can be temporarily increased by the application of a suitable magnetic field. The localized high magnetic viscosity will temporarily separate different portions of a fluid system. In the case of a flowing fluid system, a localized magnetic viscosity increase can throttle the flow, increasing the pressure drop in that section to slow the flow or increase the pressure in the system. More specifically, it may be desirable to replace or augment the mechanical valve or "choke" that controls the return flow of drilling fluid for Managed Pressure Drilling.

Magneto-rheological additives like ferromagnetic particles have been investigated as an alternative to or augmentation of viscosifying agents. It is believed that ferromagnetic particles respond to the application of a magnetic field by aligning, and thereby increasing the apparent viscosity of a fluid. Upon removal of the magnetic field, the ferromagnetic particles redisperse and the viscosity of the fluid decreases. Some ferromagnetic particles are responsive to the strength of the magnetic field thereby allowing for tuning the viscosity of the fluid.

However, the use of ferromagnetic particles in subterranean applications has been limited because of their expense in combination with the amount needed for a single treatment operation in a subterranean formation. Another barrier to application may be that ferromagnetic particles can change the density of the treatment fluid at ambient conditions, which does not allow for a simple add-in technology.

SUMMARY OF THE INVENTION

The present invention relates to treatment fluids comprising magnetic surfactants and methods relating thereto.

One embodiment of the present invention provides for a method that comprises providing a treatment fluid comprising a base fluid and a magnetic surfactant, the magnetic surfactant comprising a cationic surfactant having a magnetically susceptible counterion; and introducing the treatment fluid into a wellbore penetrating a subterranean formation.

Another embodiment of the present invention provides for a method that comprises circulating a treatment fluid into a wellbore penetrating a subterranean formation, the treatment fluid comprising a base fluid, a particulate, and a magnetic surfactant, the magnetic surfactant comprising a cationic surfactant having a magnetically susceptible counterion; and applying a magnetic field to the treatment fluid so as to increase a viscosity of the treatment fluid in the wellbore and/or subterranean formation thereby inhibiting settling of the particulate and/or increasing the particulate carrying capacity of the treatment fluid.

Yet another embodiment of the present invention provides for a method that comprises providing a treatment fluid comprising a base fluid and a magnetic surfactant, the magnetic surfactant comprising a cationic surfactant having a magnetically susceptible counterion; and separating at least some of the magnetic surfactant from the treatment fluid using a magnetic field.

The features and advantages of the present invention will be readily apparent to those skilled in the art upon a reading of the description of the preferred embodiments that follows.

DETAILED DESCRIPTION

The present invention relates to treatment fluids comprising magnetic surfactants and methods relating thereto.

The present invention provides for, in some embodiments, treatment fluids that include surfactants that respond to magnetic fields, which are referred to herein as "magnetic surfactants." As stated above, "treatment fluid" refers to any fluid that may be used in a subterranean application in conjunction with a desired function and/or for a desired purpose (i.e., any "treatment"). The terms "treatment" and "treatment fluid" do not imply any particular action and encompass, inter alia, drilling fluids, lost circulation fluids, fracturing fluids, acidizing fluids, and the like.

It should be noted that when "about" is used herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, a treatment fluid of the present invention may comprise a base fluid and a magnetic surfactant. Magnetic surfactants described herein may, in some embodiments, comprise a cationic surfactant having a magnetically susceptible counterion. Examples of suitable cationic surfactants may, in some embodiments, include, but are not limited to, $C_6$-$C_{22}$ alkylamines, quaternary ammonium surfactants having at least one $C_6$-$C_{22}$ group, ($C_6$-$C_{22}$ alkyl)-trimethylammonium surfactants, di-($C_6$-$C_{22}$ alkyl)-dimethylammonium surfactants, benzalkonium surfactants where the alkyl group is $C_6$-$C_{22}$, ($C_6$-$C_{22}$ alkyl)-imidazole surfactants, and the like, and any derivative thereof. Examples of suitable magnetically susceptible counterions may, in some embodiments, include, but are not limited to, anions of iron chloride, iron chloride bromide, dysprosium chloride, dysprosium sulfide, gadolinium chloride, erbium sulfide, manganese chloride, and the like, and any derivative thereof. Any combination of the foregoing cationic surfactants and magnetically susceptible counterion ions may be useful as magnetic surfactants for use in conjunction with treatment fluids and methods of the present invention. Further, some embodiments of the present invention may utilize a combination of two or more magnetic surfactants described herein.

In some embodiments, the magnetic surfactants described herein may be present in an amount ranging from a lower limit of about 0.1%, 0.15%, or 1% by weight of the treatment fluid to an upper limit of about 30%, 20%, 10%, 5%, or 2.5% by weight of the treatment fluid, and wherein the amount may range from any lower limit to any upper limit and encompass any subset therebetween.

Base fluids suitable for use in conjunction with treatment fluids of the present invention may, in some embodiments, include, but are not limited to, oil-based fluids, aqueous-based fluids, aqueous-miscible fluids, water-in-oil emulsions, or oil-in-water emulsions. Suitable oil-based fluids may, in some embodiments, include, but are not limited to, alkanes, olefins, aromatic organic compounds, cyclic alkanes, paraffins, diesel fluids, mineral oils, desulfurized hydrogenated kerosenes, and any combination thereof. Suitable aqueous-based fluids may, in some embodiments, include, but are not limited to, fresh water, saltwater (e.g., water containing one or more salts dissolved therein), brine (e.g., saturated salt water), seawater, acidic aqueous fluids, basic aqueous fluids, and any combination thereof. Suitable aqueous-miscible fluids may, in some embodiments, include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and any combination thereof. In some embodiments, any of the foregoing aqueous-miscible fluids or combinations thereof may be used in combination with any of the foregoing aqueous-based fluids or combinations thereof.

Water-in-oil emulsions or oil-in-water emulsions may comprise any of the foregoing oil-based fluids, aqueous-based fluids, and aqueous-miscible fluids. Suitable water-in-oil emulsions, also known as invert emulsions, may, in some embodiments, have an oil-to-water ratio ranging from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include, but are not limited to, those disclosed in U.S. Pat. No. 5,905,061 entitled "Invert Emulsion Fluids Suitable for Drilling," U.S. Pat. No. 5,977,031 entitled "Ester Based Invert Emulsion Drilling Fluids and Muds Having Negative Alkalinity," U.S. Pat. No. 6,828,279 entitled "Biodegradable Surfactant for Invert Emulsion Drilling Fluid," U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture," U.S. Pat. No. 7,645,723 entitled "Method of Drilling Using Invert Emulsion Drilling Fluids," and U.S. Pat. No. 7,696,131 entitled "Diesel Oil-Based Invert Emulsion Drilling Fluids and Methods of Drilling Boreholes," the entire disclosures of which are incorporated herein by reference. It should be noted that for water-in-oil and oil-in-water emulsions, any mixture of the above may be used including the water being and/or comprising an aqueous-miscible fluid. In some embodiments, the emulsifier used in conjunction with water-in-oil emulsions or oil-in-water emulsions may comprise magnetic surfactants described herein.

In some embodiment, the treatment fluids of the present invention may be foamed. As used herein the term foam refers to a two-phase composition having a continuous liquid phase and a discontinuous gas phase. In some embodiments, the treatment fluids of the present invention may comprise a base fluid, a magnetic surfactant, a gas, and optionally a foaming agent. In some embodiments, a magnetic surfactant described herein may act as a foaming agent, which may, in some embodiments, be the exclusive foaming agent or be used in conjunction with other foaming agents.

Suitable gases for use in conjunction with the present invention may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of fracture fluid.

In some embodiments, the quality of a foamed treatment fluid of the present invention may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may, in some embodiments, have a foam quality from about 85% to about 95%, or about 90% to about 95%.

Foaming agents suitable for use in conjunction with the present invention may, in some embodiments, include, but are not limited to, cationic foaming agents, anionic foaming agents, amphoteric foaming agents, nonionic foaming agents, or any combination thereof. Nonlimiting examples of suitable foaming agents may, in some embodiments, include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may, in some embodiments, be included in foamed treatment fluids at concentrations ranging typically from about 0.05% to about 2% of the liquid component by weight (e.g., from about 0.5 to about 20 gallons per 1000 gallons of liquid). In some embodiments, a foaming agent used in conjunction with a foamed treatment fluid may comprise magnetic surfactants described herein.

In some embodiments, the treatment fluids of the present invention may optionally further comprise magneto-rheological particulates, e.g., ferromagnetic micro-particulates, ferromagnetic nanoparticles, and the like. Magneto-rheological particulates may be useful for adjusting the viscosity of a treatment fluid in similar respects to magnetic surfactants described herein. The combination of magneto-rheological particulates and magnetic surfactants may be useful in tailoring the magneto-rheological response (e.g., viscosity change/value) of the treatment fluid at a given magnetic field strength.

In some embodiments, the magneto-rheological particulates may be present in an amount ranging from a lower limit of about 0.1%, 0.15%, or 1% by weight of the treatment fluid to an upper limit of about 30%, 20%, 10%, 5%, or 2.5% by weight of the treatment fluid, and wherein the amount may range from any lower limit to any upper limit and encompass any subset therebetween.

In some embodiments, the use of magneto-rheological particulates in combination with the magnetic surfactants described herein may enable low concentrations of magneto-rheological particulates, which may advantageously minimize the cost of the treatment fluid as compared to a treatment fluid with magneto-rheological particulates and no magnetic surfactants. In some embodiments, the magneto-rheological particulates may be present in an amount of about 5% or less by weight of the treatment fluid.

In some embodiments, the treatment fluids of the present invention may optionally further comprise non-magnetic emulsifiers, e.g., a polymer and/or a surfactant suitable for use in emulsifying a fluid such that the emulsifier has no magnetic susceptibility. Exemplary examples of non-magnetic emulsifiers may, in some embodiments, include, but are not limited to, $C_6$-$C_{22}$ sulfates, $C_6$-$C_{22}$ sulfonates, $C_6$-$C_{22}$ phosphates, $C_6$-$C_{22}$ amines, ethoxylated surfactants, polyethylene glycol-polypropylene glycol-polyethylene glycol triblock copolymers, and the like, and any combination thereof.

In some embodiments, the non-magnetic emulsifiers may be present in an amount ranging from a lower limit of about 0.1%, 0.15%, or 1% by weight of the treatment fluid to an upper limit of about 30%, 20%, 10%, 5%, or 2.5% by weight of the treatment fluid, and wherein the amount may range from any lower limit to any upper limit and encompass any subset therebetween.

In some embodiments, the treatment fluids of the present invention may optionally further comprise viscosifying agents, which may be useful in adjusting the base-viscosity of the treatment fluid where the magnetic surfactant may further be used achieving a desired viscosity at a desired location and/or at a desired time. The viscosifying agents suitable for use in conjunction with the present invention may comprise any substance (e.g., dispersed clays and/or polymeric materials, crosslinked or otherwise) capable of increasing the viscosity of the treatment fluid.

In some embodiments, the viscosifying agents may comprise one or more polymers that have at least two molecules that are capable of forming a crosslink in a crosslinking reaction in the presence of a crosslinking agent, and/or polymers that have at least two molecules that are so crosslinked (i.e., a crosslinked viscosifying agent). The viscosifying agents may, in some embodiments, be naturally-occurring viscosifying agents, synthetic viscosifying agents, and any combination thereof. The viscosifying agents also may, in some embodiments, be cationic polymers, anionic polymers, nonionic polymers, and any combination thereof.

Suitable polymeric viscosifying agents for use in conjunction with the present invention may, in some embodiments, include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may, in some embodiments, include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof. In certain embodiments, the polymeric viscosifying agents may comprise an organic carboxylated polymer, such as CMHPG.

Suitable synthetic polymers for use in conjunction with the present invention may, in some embodiments, include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the polymeric viscosifying agent comprises an acrylamide/2-(methacryloyloxy) ethyltrimethylammonium methyl sulfate copolymer. In certain embodiments, the polymeric viscosifying agent may comprise an acrylamide/2-(methacryloyloxy)ethyltrimethylammonium chloride copolymer. In certain embodiments, the polymeric viscosifying agent may comprise a derivatized cellulose that comprises cellulose grafted with an allyl or a vinyl monomer, such as those disclosed in U.S. Pat. No. 4,982,793 entitled "Crosslinkable Cellulose Derivatives," U.S. Pat. No. 5,067,565 entitled "Crosslinkable Cellulose Derivatives," and U.S. Pat. No. 5,122,549 "Crosslinkable Cellulose Derivatives," the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as polymeric viscosifying agents.

The crosslinking agents suitable for use in conjunction with the present invention may, in some embodiments, include, but are not limited to, a borate ion, a metal ion, or similar component that is capable of crosslinking at least two molecules of a polymeric viscosifying agent. Examples of suitable crosslinking agents may, in some embodiments, include, but are not limited to, borate ions, magnesium ions, zirconium IV ions, titanium IV ions, aluminum ions, antimony ions, chromium ions, iron ions, copper ions, magnesium ions, and zinc ions. These ions may, in some embodiments, be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof.

In some embodiments, suitable combinations of any of the aforementioned polymeric viscosifying agents and/or crosslinking agents may be utilized.

Viscosifying agents may be present in the treatment fluids described herein in an amount sufficient to provide the desired viscosity. In some embodiments, the viscosifying agents may be present in an amount ranging from a lower limit of about 0.1%, 0.15%, or 1% by weight of the treatment fluid to an upper limit of about 10%, 5%, or 2.5% by weight of the treatment fluid, and wherein the amount may range from any lower limit to any upper limit and encompass any subset therebetween. In some embodiments, the crosslinking agents may be present in an amount ranging from a lower limit of about 0.005%, 0.01%, or 0.05% by weight of the treatment fluid to an upper limit of about 1%, 0.5%, or 0.1% by weight of the treatment fluid, and wherein the amount may range from any lower limit to any upper limit and encompass any subset therebetween.

In some embodiments, the treatment fluids of the present invention may optionally further comprise particulates (e.g., wellbore cuttings, proppants, gravel particles, weighting agents, lost circulation materials, and any combination thereof). Particulates suitable for use in conjunction with the present invention may comprise any material suitable for use in subterranean operations. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

In some embodiments, particulates (like proppants, gravel particles, and lost circulation materials) may comprise a material that may, in some embodiments, include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, fibers of cellulose (e.g., including viscose cellulosic fibers, oil coated cellulosic fibers, and fibers derived from a plant product like paper fibers), carbon including carbon fibers, melt-processed inorganic fibers (e.g., basalt fibers, woolastonite fibers, non-amorphous metallic fibers, metal oxide fibers, mixed metal oxide fibers, ceramic fibers, and glass fibers), polymeric fibers (e.g., polypropylene fibers and poly(acrylic nitrile) fibers), metal oxide fibers, mixed metal oxide fibers, and the like, and any combination thereof. One skilled in the art with the benefit of this disclosure should recognize that the materials of the particle should be chosen based on the application of the particle, for example, proppants may utilize high-crushed strength materials and lost circulation materials may utilize a water range of materials.

Specific examples of particulates may, in some embodiments, include, but not be limited to, BARACARB® particulates (ground marble, available from Halliburton Energy Services, Inc.) (e.g., BARACARB® 5, BARACARB® 25, BARACARB® 150, BARACARB® 600, and BARACARB® 1200), STEELSEAL® particulates (resilient graphitic carbon, available from Halliburton Energy Services, Inc.) (e.g., STEELSEAL® powder, STEELSEAL® 50, STEELSEAL® 150, STEELSEAL® 400, and STEELSEAL® 1000), WALL-NUT® particulates (ground walnut shells, available from Halliburton Energy Services, Inc.) (e.g., WALL-NUT® M, WALL-NUT® coarse, WALL-NUT® medium, and WALL-NUT® fine), BARAPLUG® (sized salt water, available from Halliburton Energy Services, Inc.) (e.g., BARAPLUG® 20, BARAPLUG® 50, and BARAPLUG® 3/300), BARAFLAKE® (calcium carbonate and polymers, available from Halliburton Energy Services, Inc.), PAN fibers (i.e., carbon fibers derived from poly(acrylonitrile)), PANEX® fibers (carbon fibers, available from Zoltek) (e.g., PANEX® 32, PANEX® 35-0.125", and PANEX® 35-0.25"), PANOX® (oxidized PAN fibers, available from SGL Group), rayon fibers (e.g., BDF™ 456 (rayon fibers, available from Halliburton Energy Services, Inc.)); poly(lactide) ("PLA") fibers, alumina fibers, cellulosic fibers, BAROFIBRE® fibers (cellulosic fiber, available from Halliburton Energy Services, Inc.) (e.g., BAROFIBRE® and BAROFIBRE® C), and the like, and any combination thereof.

In some embodiments, weighting agents may include, but are not limited to, barite, precipitated barite, submicron precipitated barite, hematite, ilmentite, manganese tetraoxide, galena, calcium carbonate, and any combination thereof.

In some embodiments, the particulates described herein may be present in the treatment fluids of the present invention in an amount ranging from a lower limit of about 0.5 pounds per gallon ("ppg"), 1 ppg, or 5 ppg of the treatment fluid to an upper limit of about 30 ppg, 25 ppg, 20 ppg, or 10 ppg of the treatment fluid, and wherein the amount may range from any lower limit to any upper limit and encompass any subset therebetween.

In some embodiments, the magnetic surfactants described herein may coat at least a portion of a surface of a particulate in the treatment fluid. As used herein, the term "coating," and the like, does not imply any particular degree of coating on the particulate. In particular, the terms "coat" or "coating" do not imply 100% coverage by the coating on the particulate.

In some embodiments, the treatment fluids of the present invention may optionally further comprise additives. Additives suitable for use in conjunction with treatment fluids of the present invention may include, but are not limited to, salts, corrosion inhibitors, emulsion thinners, emulsion thickeners, pH control additives, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof.

In some embodiments, a treatment fluid of the present invention may comprise a base fluid described herein and a magnetic surfactant described herein and optionally further comprise at least one of: magneto-rheological particulates described herein, viscosifying agents described herein, foaming agents described herein, gases described herein, particulates described herein, and additives described herein, each of which may independently be at a suitable concentration as described herein. In some embodiments, treatment fluids described herein may be prepared, in whole or in part, off-site, at the well site, and/or on-the-fly.

Some embodiments of the present invention may involve using a magnetic field to adjust the viscosity of a treatment fluid described herein. For example, increasing the strength of the magnetic field may increase the viscosity of the treatment fluid and decreasing the strength of the magnetic field may decrease the viscosity of the fluid.

In some embodiments, adjustments to the viscosity of a treatment fluid described herein utilizing a magnetic field may occur in a wellbore and/or subterranean formation, at a wellhead where the treatment fluid is introduced to and/or removed from the wellbore, in an apparatus before the treatment fluid is introduced into the wellbore, and in an apparatus after the treatment fluid is removed from the wellbore, and any combination thereof.

In some embodiments, the magnetic field may be associated with an apparatus like a screen, a shaker, a centrifuge, a choke, a blowout preventer, and the like, and any combination thereof.

Increasing the viscosity and/or apparent density of the treatment fluid may be particularly useful in wellbore operations where the treatment fluid comprises particulates, e.g., to mitigate particulate settling and/or to increase the carrying or transport capacity for particulates in the treatment fluid. In some embodiments, the viscosity and/or apparent density of the treatment fluid may be adjusted to inhibit settling of particulates from a treatment fluid, e.g., during drilling operations or proppant placement operations. In some embodiments, the viscosity and/or apparent density of the treatment fluid may be adjusted to increase the carrying or transport capacity for particulates in the treatment fluid, e.g., during drilling operations or proppant placement operations. In some embodiments, the inhibition of particulate settling and/or increased particulate carrying capacity may be localized where a magnetic field is applied, which may be advantageous in zones within a wellbore that may be susceptible to particulate settling, e.g., high-temperature zones where shear thinning may be prevalent.

As illustrated in the present disclosure, treatment fluids described herein may be utilized in a plurality of subterranean operations. Examples of suitable subterranean operations that can utilize the treatment fluids described herein may include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations. The methods and compositions of the present invention may be used in full-scale operations or pills. As used herein, a "pill" is a type of relatively small volume of specially prepared treatment fluid placed or circulated in the wellbore.

By way of nonlimiting example, some embodiments of the present invention may involve introducing a treatment fluid described herein into a wellbore penetrating a subterranean formation. Some embodiments of the present invention may further involve applying and/or adjusting a magnetic field in electromagnetic communication with at least a portion of the treatment fluid, e.g., before, after, and/or during introduction of the treatment fluid into the wellbore.

By way of another nonlimiting example, some embodiments of the present invention may involve circulating a treatment fluid described herein in a wellbore while drilling at least a portion of the wellbore. Some embodiments of the present invention may further involve applying and/or adjusting a magnetic field in electromagnetic communication with at least a portion of the treatment fluid during drilling, e.g., before, after, and/or during suspension of wellbore cuttings in the treatment fluid.

Some embodiments of the present invention may involve applying and/or adjusting a magnetic field in electromagnetic communication with at least a portion of a treatment fluid described herein so as to remove the magnetic surfactant and a material(s) associated therewith from the portion of treatment fluid.

By way of nonlimiting example, some embodiments of the present invention may involve separating a discontinuous phase of a treatment fluid described herein from a continuous phase of the treatment fluid using a magnetic field electromagnetic communication with the treatment fluid. In some embodiments, the discontinuous phase of the treatment fluid may comprise a material (e.g., a chemical or particulate), which may be separated from the continuous phase of the treatment fluid by extracting the discontinuous phase of the treatment fluid utilizing the magnetic field. In some embodiments, the magnetic field may be associated with an apparatus like a screen, a shaker, a centrifuge, and the like, and any combination thereof.

By way of another nonlimiting example, some embodiments of the present invention may involve separating a particulate from a treatment fluid, the particulate being at least partially coated with a magnetic surfactant.

By way of yet another nonlimiting example, some embodiments of the present invention may involve separating a micelle at least partially formed by a magnetic surfactant described herein from the treatment fluid. In some embodiments, the micelle may comprise a chemical therein that remains in the micelle during separation.

Some embodiments of the present invention may involve applying and/or adjusting a magnetic field in electromagnetic communication with at least a portion of a treatment fluid described herein so as to remove the magnetic surfactant and a material(s) associated therewith from the portion of treatment fluid; and recycling the magnetic surfactant and/or materials associated therewith.

In some embodiments, environmental remediation procedures associated with a treatment fluid described herein may involve utilizing magnetic fields in methods similar to those described herein relating to separating portions of a treatment fluid (e.g., particles, micelles, discontinuous phases, and the like).

The exemplary magnetic surfactants and/or an applied magnetic field disclosed herein may directly or indirectly affect one or more components or pieces of equipment associated with the preparation, delivery, recapture, recycling, reuse, and/or disposal of the disclosed magnetic surfactants. For example, the disclosed magnetic surfactants and/or an applied magnetic field may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary magnetic surfactants described herein. The disclosed magnetic surfactants and/or an applied magnetic field may also directly or indirectly affect any transport or delivery equipment used to convey the magnetic surfactants to a well site or downhole such as, for example, any transport vessels, conduits, pipelines, trucks, tubulars, and/or pipes used to fluidically move the magnetic surfactants from one location to another, any pumps, compressors, or motors (e.g., topside or downhole) used to drive the magnetic surfactants into motion, any valves or related joints used to regulate the pressure or flow rate of the magnetic surfactants, and any sensors (i.e., pressure and temperature), gauges, and/or combinations thereof, and the like. The disclosed magnetic surfactants and/ or an applied magnetic field may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising a base fluid and a magnetic surfactant, the magnetic surfactant comprising a cationic surfactant having a magnetically susceptible counterion, wherein the magnetically susceptible counterion comprises at least one anion of the group of dysprosium chloride, dysprosium sulfide, erbium sulfide, and any derivative thereof; and
   introducing the treatment fluid into a wellbore penetrating a subterranean formation; and
   applying a magnetic field to the treatment fluid so as to increase a viscosity of the treatment fluid at a location outside the wellbore.

2. The method of claim 1 further comprising:
   applying a magnetic field to the treatment fluid so as to increase a viscosity of the treatment fluid in the wellbore and/or subterranean formation.

3. The method of claim 1, wherein applying the magnetic field occurs with at least one apparatus selected from the group consisting of a screen, a shaker, a centrifuge, a choke, a blowout preventer, and any combination thereof.

4. The method of claim 1 further comprising:
   circulating the treatment fluid in the wellbore while drilling at least a portion of the wellbore.

5. The method of claim 1, wherein the base fluid comprises at least one selected from the group consisting of an aqueous fluid, an aqueous miscible fluid, an oleaginous fluid, and any combination thereof.

6. The method of claim 1, wherein the treatment fluid is an emulsion.

7. The method of claim 6 further comprising:
   separating a discontinuous phase of the treatment fluid from a continuous phase of the treatment fluid using a magnetic field.

8. The method of claim 1, wherein the magnetic surfactant is present in the treatment fluid in an amount between about 0.1% and about 30% by weight of the base fluid.

9. The method of claim 1, wherein the treatment fluid further comprises particulates.

10. The method of claim 1, wherein the treatment fluid further comprises a magneto-rheological particulate.

11. The method of claim 10, wherein the magneto-rheological particulate is present in the treatment fluid in an amount of about 5% or less by weight of the treatment fluid.

12. The method of claim 1, wherein the treatment fluid is foamed and further comprises a gas.

13. A method comprising:
    providing a treatment fluid comprising a base fluid and a magnetic surfactant, the magnetic surfactant comprising a cationic surfactant having a magnetically susceptible counterion, wherein the magnetically susceptible counterion comprises at least one anion of the group of dysprosium chloride, dysprosium sulfide, erbium sulfide, and any derivative thereof; and
    separating at least some of the magnetic surfactant from the treatment fluid using a magnetic field.

14. The method of claim 13, wherein the treatment fluid further comprises a plurality of particulates that comprises a coating that comprises the magnetic surfactant, and wherein separating involves removing at least some of the particulates from the treatment fluid.

15. The method of claim 13, wherein the magnetic surfactant is associated with a discontinuous phase of the treatment fluid, and wherein separating involves removing at least some of the discontinuous phase from the treatment fluid.

16. The method of claim 13, wherein the treatment fluid further comprises a plurality of micelles that comprise the magnetic surfactant and a chemical inside the micelles, and wherein separating involves removing at least some of the micelles from the treatment fluid.

17. A method comprising:
    providing a treatment fluid comprising a base fluid, a magnetic surfactant, and a magneto-rheological particulate, the magnetic surfactant comprising a cationic surfactant having a magnetically susceptible counterion, wherein the magnetically susceptible counterion comprises at least one anion of the group of dysprosium chloride, dysprosium sulfide, erbium sulfide, and any derivative thereof; and
    introducing the treatment fluid into a wellbore penetrating a subterranean formation.

18. A method comprising:
    providing a treatment fluid comprising a base fluid and a magneto-rheological particulate, the magnetic surfactant comprising a cationic surfactant having a magnetically susceptible counterion, wherein the magnetically susceptible counterion comprises at least one anion of the group of dysprosium chloride, dysprosium sulfide, erbium sulfide, and any derivative thereof, wherein the treatment fluid is an emulsion;

introducing the treatment fluid into a wellbore penetrating a subterranean formation; and separating a discontinuous phase of the treatment fluid from a continuous phase of the treatment fluid using a magnetic field.

* * * * *